United States Patent [19]
Gavlin et al.

[11] Patent Number: 5,853,458
[45] Date of Patent: Dec. 29, 1998

[54] GLYCOL SOLVENTS AND METHOD THEREOF

[75] Inventors: Gilbert Gavlin, Lincolnwood; Boris Goltsin, Skokie, both of Ill.

[73] Assignee: Gavlin Associates, Inc, Lincolnwood, Ill.

[21] Appl. No.: 916,732

[22] Filed: Aug. 18, 1997

Related U.S. Application Data

[63] Continuation-in-part of Ser. No. 846,215, Apr. 28, 1997, abandoned.

[51] Int. Cl.[6] .................................................... B01D 47/06
[52] U.S. Cl. ................................ 95/231; 96/295; 96/322; 568/853
[58] Field of Search ........................... 95/231, 230, 149; 96/243, 322, 327, 290, 295; 568/852, 853

[56] References Cited

U.S. PATENT DOCUMENTS

| | | | |
|---|---|---|---|
| 1,866,560 | 7/1932 | Gordon | 95/231 |
| 2,603,311 | 7/1952 | Frazier | 95/231 |
| 2,988,171 | 6/1961 | Arnold et al. | 95/231 |
| 3,349,544 | 10/1967 | Arnold et al. | 95/231 |
| 4,602,920 | 7/1986 | Diaz et al. | 95/231 |
| 4,979,965 | 12/1990 | Sannholm | 95/231 |
| 5,127,231 | 7/1992 | Larue et al. | 95/231 |
| 5,462,584 | 10/1995 | Gavlin et al. | 95/231 |
| 5,725,637 | 3/1998 | Gavlin et al. | 95/231 |

OTHER PUBLICATIONS

Chap 11, Gas Purification, Fourth Edition 1985.

Chap 18 .2, Handbook Of Solvent Extractions 1983.

*Primary Examiner*—Duane S. Smith
*Attorney, Agent, or Firm*—John L Hutchinson

[57] ABSTRACT

A solvent composition comprising a glycol, a potassium carboxylate and a neopentyl alcohol having improved dehydrating capacity and reduced absorbency for aliphatic and aromatic hydrocarbons.

12 Claims, No Drawings

GLYCOL SOLVENTS AND METHOD THEREOF

This application is a continuation in part of application Ser. No. 08/846,215, filed on Apr. 28, 1997, now abandoned.

FIELD OF THE INVENTION

This invention relates to improving the action of glycol solvents and, specifically, ethylene and polyethylene glycol solvents for use more effectively in a wide variety of applications.

OBJECTS

It is an object of this invention to provide a glycol solvent having improved dehydration ability.

Another object is to provide an improved glycol solvent for dehydrating natural gas wherein the solvent has a reduced capacity for absorbing aliphatic and aromatic hydrocarbons from the gas.

A further object is to provide a glycol solvent which has a selective difference in absorbency between aliphatic and aromatic hydrocarbons.

BACKGROUND OF INVENTION

Glycol solvents such as ethylene and polyethylene glycol solvents are used in a number of important industrial applications, for example, dehydration of natural gas, production of anhydrous ethanol and other water soluble solvents and in separation of aromatic hydrocarbons from petroleum fractions. Examples of glycol solvents are tetraethylene glycol, triethylene glycol, diethylene glycol and ethylene glycol. Such glycols usually contain between about 0% to 5% by weight of water.

The use of glycols for dehydration of gases and, particularly, natural gas is disclosed in some detail in Chapter 11 of Gas Purification, Fourth Edition, Kohl and Riesenfeld, 1985. The principal glycols used in gas dehydration are diethylene glycol and triethylene glycol. As stated in the foregoing publication, the factors leading to the use of glycols are their unusual hygroscopicity, their excellent stability to heat and chemical decomposition, and their low vapor pressure. The dehydration process involves the use of a counter current system wherein the glycol stream containing from about 1 to 5 percent water is contacted with an upward flow of gas to be dehydrated, generally in the temperature range of about 85° to 105° F. After the dehydration process, the diluted glycol stream is regenerated or reconcentrated by distilling out the water absorbed, usually by vacuum regeneration.

The glycols as indicated above have also been used in the production of anhydrous ethanol and other water soluble type compositions to remove water. Ethanol when derived from a corn base as an additive to gasoline is initially formed as a solution of up to about 50% water. For use as a gasoline additive the water must be removed, by extractive distillation with a water solvent, such as one of the aforementioned glycols.

Further, the separation of aromatic hydrocarbons, such as the BTX components (benzene, toluene and xylene), from petroleum fractions by liquid-liquid extraction frequently use as solvents glycols and, in particular, diethylene glycol (DEG) and triethylene glycol (TEG). A brief review of this process and improvements is available in Chapter 18.2, Handbook of Solvent Extraction, John Wiley & Sons, 1983.

DESCRIPTION OF THE INVENTION

In our application entitled "Gas Dehydration Process," Ser. No. 08/585,636, we have disclosed and claimed a process for gas dehydration involving the use of glycols such as defined herein, with a potassium carboxylate, in particular, potassium formate and potassium acetate. The use of such additives to the glycols was found to enhance the resulting combination as a dehydrating solvent. In our subsequently filed application entitled "Improvements In Gas Dehydration", Ser. No. 08/846,215, now abandoned, of which this application is a continuation-in-part, we have disclosed the addition of pentaerythritol to the glycol-potassium carboxylate combination to further improve the dehydration capabilities of the combination. The present application is directed to amplifying this discovery.

As the result of further research into the use of pentaerythritol, it was discovered that certain analogous neopentyl alcohol compounds, in addition to penerythritol, were likewise available as enhancements to the glycol-potassium-carboxylate compositions in dehydration. Further, and equally important, it was found that the neopentyl alcohol-glycol-potassium carboxylate compositions also offer the opportunity to enhance the production of anhydrous ethanol and similar water soluble compounds by extractive distillation and likewise has the potential capability in separation of aromatic compounds from petroleum fractions by liquid-liquid extraction.

The neopentyl alcohol compounds with which this invention is concerned are characterized by the following basic structure:

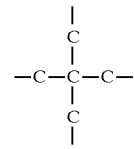

Illustrative compounds are pentaerythritol

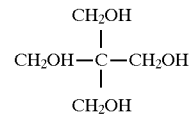

1,1,1 Tris (hydroxymethyl) ethane

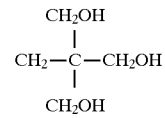

and neopentyl glycol

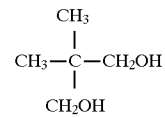

The possibility of replacing a methyl group with another group to tailor a compound for a specific purpose can be made.

Decomposition of alcohols is initiated primarily by a dehydration reaction in which the —OH associates with hydrogen from an alpha carbon forming water. In the neopentyl structure there is no alpha hydrogen and, hence, such alcohols are stable to dehydration. Further, they have low vapor pressure and will not be affected by the usual solvent regeneration process.

An important feature of this invention is the discovery that by adding both a potassium carboxylate and a neopentyl alcohol to the glycol solvent the solubility of each compound in the glycol solvent is increased considerably beyond the normal solubility of the respective individual compounds when used alone.

Accordingly, the compositions contemplated by this invention comprise a glycol from the group comprising tetraethylene glycol, ethylene glycol, diethylene glycol and triethylene glycol, a potassium carboxylate salt primarily from the group comprising potassium formate and potassium acetate and a neopentyl alcohol as defined above, wherein the composition contains from about 0% –5% by weight of water.

The neopentyl alcohols have varying degrees of solubility in a glycol-carboxylate composition, ranging from pentaerythritol as the least soluble to neopentyl glycol as the most soluble. At present, based on overall effectiveness, for some applications the neopentyl alcohol with intermediate solubility is sometimes preferred, namely 1,1,1 tris (hydroxymethyl) ethane.

To illustrate the new discovery related to the effect between a potassium carboxylate and a neopentyl alcohol in improving the solubility of each in glycol solvents, reference is made to the following Table 1 wherein TEG indicates triethylene glycol, DEG indicates diethylene glycol and PE indicates pentaerythritol.

TABLE 1

SOLUBILITY OF POTASSIUM FORMATE (KFO) AND PENTAERYTHRITOL (PE) IN GLYCOLS
t: 25° C.

|  | glycol | water w % | KFO[1] w % | PE w % |
|---|---|---|---|---|
| 1. | TEG | — | — | 1.5[s] |
| 2. | TEG | 5 | — | 1.6[s] |
| 3. | TEG | — | 21[s] | — |
| 4. | TEG | 5 | 25[s] | — |
| 5. | TEG | 5 | 20 | 4.9[s] |
| 6. | TEG | 5 | 29 | 4.9 |
| 7. | TEG | 5 | 30[s] | 5.7[s] |
| 8. | DEG | — | — | 1.7[s] |
| 9. | DEG | 5 | — | 2.0[s] |
| 10. | DEG | — | 25[s] | — |
| 11. | DEG | 5 | 25 | 4[s] |
| 12. | DEG | 5 | 35 | 5.7[s] |
| 13. | 60/40[2] | 5 | 35 | 6 |

[s]saturated solution
[1]potassium formate
[2]60/40; 60 w % TEG, 40 w % DEG

To illustrate the ability of the addition of a neopentyl alcohol, such as pentaerythritol (PE) to a glycol-potassium carboxylate combination to aid and improve the absorption of water in dehydrating a gas the following data in Table 2 is submitted using air passed through the solvent, initially saturated with water at room temperature (2 wt %).

TABLE 2

| Solvent Solution | Temp °C. | Weight percent of air after treatment with solvent containing 5 wt % of water |
|---|---|---|
| 1. TEG | 30 | 0.6 |
|  | 40 | 1.0 |
| 2. 25% KFO in DEG | 30 | 0.3 |
|  | 40 | 0.6 |
| 3. 35% KFO in TEG/DEG- 60/40 with 6.0% PE | 30 | 0.0 |
|  | 40 | 0.1 |

It will be noted that the addition of pentaerythritol to the potassium formate-TEG, DEG combination, as an example, has markedly reduced the water content of the saturated air.

With respect to dehydration of natural gas the glycol solvent-potassium carboxylate-neopentyl alcohol combination has the further advantage in reducing the absorption by the solvent of both aliphatic and aromatic hydrocarbons thereby eliminating such hydrocarbons from being discharged into the atmosphere when the solvent is regenerated, and, correspondingly, eliminating an environmental problem. This ability is demonstrated in the following Table 3 indicating the respective reduction in solubility of cyclopentane (CP) and benzene (BZ) in a glycol solvent of the present type.

TABLE 3

Solubility Suppression of Cyclopentane (CP) and Benzene (BZ) in Glycols Potassium Formate (KOF) and 1,1,1 Tris (hydroxymethyl) ethane (TE)
t, 25° C.

| GLYCOL | wt % | KOF wt % | H$_2$O wt % | TE[s] wt % | SOLUBILITY CP wt % | BZ wt % |
|---|---|---|---|---|---|---|
| TEG | 100 | — | — | — | 4 | ∞ |
| TEG | 95 | — | 5 | — | 2.3 | 23.6 |
| TEG | 80 | 20.0 | — | — | 1.4 | 20.0 |
| TEG | 76 | 19.0 | 5 | — | 0.8 | 12.3 |
| TEG | 84.8 | — | — | 15.2 | 2.1 | 30.3 |
| TEG | 76.0 | — | 5 | 19.0 | 1.3 | 17.7 |
| TEG | 70.2 | 7.8 | — | 22.0 | 0.7 | 15.0 |
| TEG | 66.7 | 7.4 | 5 | 20.9 | 0.4 | 9.6 |
| TEG | 60.5 | 15.1 | — | 24.4 | 0.6 | 15.8 |
| TEG | 57.1 | 14.3 | 5 | 23.6 | 0.3 | 9.6 |
| TEG | 58.5 | 19.0[s] | — | 22.5 | 0.5 | 13.1 |
| TEG | 49.9 | 21.4[s] | 5 | 23.7 | 0.2 | 6.4 |
| DEG | 100 | — | — | — | 2.3 | 31.0 |
| DEG | 95 | — | 5 | — | 1.4 | 18.0 |
| DEG | 75 | 25.0 | — | — | 0.5 | 11.3 |
| DEG | 71.3 | 23.7 | 5 | — | 0.2 | 7.4 |
| DEG | 80.0 | — | — | 20.0 | 1.6 | 21.0 |
| DEG | 77.8 | — | 5 | 17.2 | 1.1 | 14.1 |
| DEG | 53.4 | 17.8 | — | 28.8 | 0.2 | 6.4 |
| DEG | 50.6 | 16.8 | 5 | 27.6 | 0.3 | 3.8 |
| DEG | 46.2 | 24.8[s] | — | 29.0 | 0.3 | 1.4 |
| DEG | 43.8 | 23.6[s] | 5 | 27.6 | 0.1 | 4.6 |
| 60/40** | 62.2 | 17.6 | — | 20.2 | 0.7 | 8.5 |
| 60/40 | 52.9 | 15.9 | 5 | 26.2 | 0.4 | 8.5 |
| 60/40 | 50.4 | 21.6 | — | 28.0 | 0.4 | 4.2 |
| 60/40 | 47.9 | 20.5 | 5 | 26.6 | 0.2 | 2.9 |

TEG: Triethyleneglycol
DEG: Diethyleneglycol
[s]: saturation concentration
**60/40: 60 wt % TEG + 40 wt % DEG It will be appreciated that each particular application will have a bearing on and determine the composition of the solvents contemplated herein. In general the potassium carboxylate will comprise between about 7% to 35% by weight of the glycol solvent while the neopentyl alcohol will comprise between about 4% to 28% by weight. Factors affecting the respective weight percentages will involve not only the end application but also the type of base glycol, the type of potassium carboxylate, and, of course, the type of neopentyl alcohol to be used.

Having disclosed certain basic embodiments of the invention the same is only intended to be limited by the following claims.

We claim:

1. A glycol solvent comprising a glycol selected from the group consisting of ethylene glycol, diethylene glycol, triethylene glycol and tetraethylene glycol; a potassium carboyxlate selected from the group consisting of potassium formate and potassium acetate; and a neopentyl alcohol.

2. A glycol solvent as described in claim 1 wherein the neopentyl alcohol is selected from the group consisting of pentaerythritol, 1,1,1 Tris (hydroxymethyl) ethane and neopentyl glycol.

3. A glycol solvent as described in claim 2 wherein the potassium carboxylate is potassium formate.

4. A glycol solvent as described in claim 3 wherein the neopentyl alcohol is 1,1,1 Tris (hydroxymethyl) ethane.

5. In a process for dehydrating a gas comprising passing said gas in contact with a solvent comprising a glycol selected from the group consisting of tetraethylene glycol, triethylene glycol, diethylene glycol and ethylene glycol; a potassium carboxylate; and a neopentyl alcohol.

6. A process as described in claim 5 wherein the neopentyl alcohol is selected from the group consisting of pentaerythritol, 1,1,1 Tris (hydroxymethyl) ethane and neopentyl glycol.

7. A process as described in claim 6 wherein the potassium carboxylate is potassium formate.

8. A process as described in claim 6 wherein the gas is natural gas.

9. A process as described in claim 8 wherein the solvent contains between about 1% –5% water by weight.

10. A process as described in claim 9 wherein solvent and natural gas are contacted in a counter current system.

11. A process of dehydrating a water solution of ethanol by subjecting said water solution to extractive distillation in the presence of a composition as described in claim 1.

12. A process of separating aromatic hydrocarbons from petroleum fractions by liquid-liquid extraction in the presence of a composition described in claim 1.

* * * * *